3,359,220
SELF-EXTINGUISHING EXPANDABLE
STYRENE POLYMERS
Harold A. Wright, Murrysville, Pa., assignor to Koppers
Company, Inc., a corporation of Delaware
No Drawing. Filed Sept. 17, 1965, Ser. No. 488,248
9 Claims. (Cl. 260—2.5)

This invention relates generally to self-extinguishing, flame-retardant polymeric materials and, more particularly, to foamable self-extinguishing, flame-retardant vinyl-aryl polymer compositions, especially expandable styrene polymers.

Polymeric foam is so light in weight and has such good heat insulating qualities that its use in building construction is highly desirable, but a prerequisite for such use of polymeric foam is that it have fire-retardant properties. In the past, lower alkyl compounds containing bromine have been added to the polymer to render the foam self-extinguishing. When such brominated alkanes are used in sufficient amounts to render the polymer composition self-extinguishing, such amounts tend to adversely affect the molding properties of the particles; for example, by causing poor fusion and shrinkage of the polymer foam. Brominated alkanes also tend to hydrolyze with the evolution of toxic gases and the deterioration and discoloration of the foam. The presence of a peroxide in the polymer has a synergistic action with brominated alkanes and permits a smaller amount thereof to render the polymer self-extinguishing.

In accordance with this invention a self-extinguishing expandable styrene polymer composition is provided by incorporating with an expandable styrene polymer, about 0.5–5 percent by weight of the polymer of a brominated fatty oil selected from the group consisting of brominated cottonseed oil, brominated rapeseed oil, brominated safflower oil, brominated linseed oil, brominated hempseed oil, brominated corn oil, brominated poppyseed oil, brominated soybean oil, brominated perilla oil, and brominated sunflower oil.

The foregoing brominated fatty oils are derived from naturally occurring fatty oils. The oils are brominated by conventional procedures, such as, for example, the method described in U.S. Patent No. 3,028,403. Such naturally occurring oils are mixtures of polyunsaturated glycerides which contain, as fatty acid moities, such acids as linoleic acid, linolenic acid, linoleaidic acid, elaidolinolenic acid, arachidonic acid, etc. The approximate composition of typical fatty oils suitable for use in the invention is shown in Table I. The remainder of the oils is made up of minor amounts of saturated and other unsaturated fatty acid glycerides.

TABLE I

| Oil | Percent by Weight Unsaturated Fatty Acid Composition | | | Typical Iodine Number [2] of Base Oil | Typical Bromine Contents of Brominated Oil, percent |
|---|---|---|---|---|---|
| | Oleic (mono-ethanoid) | Linoleic | Linolenic | | |
| Cottonseed | 18 | 52 | | 103–113 | 37 |
| Rapeseed | [1] 32 | 19 | 10 | 104–110 | 38 |
| Safflower | 14 | 75 | | 133–145 | 44 |
| Linseed | 20 | 14 | 56 | 180–195 | 51 |
| Hempseed | 13 | 53 | 24 | 160–175 | 48 |
| Corn | 29 | 55 | 1 | 118–128 | 40 |
| Poppyseed | 30 | 62 | | 130–140 | 42 |
| Soybean | 25 | 53 | 7 | 125–135 | 41 |
| Perilla | 16 | 14 | 62 | 193–208 | 54 |
| Sunflower | 19 | 68 | 1 | 128–138 | 42 |

[1] +34 Erucic.
[2] See "Handbook of Chemistry and Physics," 42nd Edition 1960–61, page 3101.

Each fatty oil listed above contains a total of at least about 29 percent by weight of linoleic,

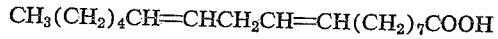

$CH_3(CH_2)_4CH{=}CHCH_2CH{=}CH(CH_2)_7COOH$ and/or linolenic acid,

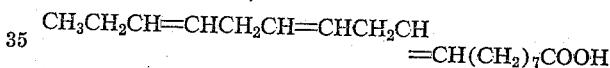

$CH_3CH_2CH{=}CHCH_2CH{=}CHCH_2CH$
$={}CH(CH_2)_7COOH$

Linoleic and linolenic acids are characterized by the fact that they contain at least two non-terminal, non-conjugated ethylenic bonds which are separated by a single methylene group.

It is desirable to brominate completely the double bonds of the fatty oils. In actual practice the fatty oils are substantially brominated although somewhat less than the amount of bromine is added that would be expected, based upon the iodine number or about 95% of the theoretical value. This is probably due to the occurrence of some hydrogen bromide addition across the double bonds.

When the non-conjugated ethylenic bonds are substantially brominated to form the self-extinguishing agents of the invention, a structure is obtained in which the positioning of the bromine atoms in the molecule causes them to be rapidly evolved as hydrogen bromide when heated to a temperature between about 140° and 180° C. The compounds are stable at normal processing temperatures; however, once they are heated to a point where a bromine atom and a hydrogen atom are evolved from adjacent carbon atoms as hydrogen bromide, the remaining structure is largely allylic in nature with respect to a remaining bromine atom. This type of structure is activated with respect to the easy evolution of an additional molecule of hydrogen bromide so that the evolution of all the bromine in the compounds rapidly occurs. Because of this rapid evolution of hydrogen bromide, which is generally accepted to be the active agent that terminates combustion, lower bromine concentrations in the polymer and consequently less self-extinguishing agent per weight of polymer is needed. Therefore the effect on the molding properties of the foam due to the presence of the self-extinguishing agents is diminished in comparison with self-extinguishing agents which have been used heretofore.

While the surprising effectiveness of the brominated fatty oils permits them to be effective at low concentrations in the polymer, the presence of the agent has this tendency for adverse effect on the molding properties of the polymer, i.e., poor fusion and foam shrinkage.

It has now been found that the presence in the styrene polymer of a small amount of tung oil obtained by copolymerizing the tung oil with a styrene monomer overcomes the tendency for difficulties in molding heretofore encountered. Quite surprisingly, there is produced a polymer foam which does not tend to shrink appreciably on molding. Surprisingly also, the incorporation of the tung oil also has a synergistic effect in that the effectiveness of the self-extinguishing agent is enhanced, as evidenced by the fact that the polymer foam can be rendered self-extinguishing with even lower amounts of self-extinguishing agent than are required when the tung oil is not present in the polymer. The tung oil is incorporated in the polymer by adding the tung oil to the styrene monomer prior to polymerization so that it is copolymerized with the styrene monomer. A minimum of 0.1 percent by weight of tung oil must be employed in order to get any substantial improvement of the molding and self-extinguishing properties of the foam. Amounts more than 0.5 percent by weight of polymer of tung oil on the other hand are unnecessary and have the adverse effect of retarding the rate of polymerization of the styrene monomer.

The term "styrene polymer" as used herein includes homopolymers and copolymers derived from vinylaryl monomers including styrene, isopropyl styrene, alpha-methylstyrene, nuclear dimethylstyrenes, chlorostyrenes, vinylnaphthalene, etc., as well as copolymers prepared by the polymerization of a vinyl aromatic monomer with minor amounts of monomers such as acrylonitrile, methylmethacrylate, etc.

Conveniently, the polymerization of the styrene monomer and tung oil is carried out in aqueous suspension, such as is described, for example, in U.S. Patent 2,907,756 wherein a styrene monomer in water is polymerized in the presence of a catalyst system of t-butylperbenzoate and benzoyl peroxide at a fixed time-temperature cycle using a suspending system to maintain the styrene monomer suspended in the water in the form of particles or beads.

To render the polymer particles expandable, the blowing agent is incorporated into the particles either during or after the polymerization. Processes for such incorporation are described in Patent No. 3,192,169 and Patent No. 2,983,692. Preferred blowing agents include volatile aliphatic hydrocarbons containing from 1–7 carbon atoms in the molecule, i.e., ethane, methane, propane, butane, pentane, hexane, heptane, cyclohexane, and their halogenated derivatives which boil below the softening point of the resin. Usually from 3–20 percent by weight of polymer of the blowing agent is incorporated therein.

Advantageously, the self-extinguishing agents are incorporated in the polymer by adding them to the monomer charge prior to polymerization. However, if desired, the self-extinguishing agents can be incorporated into the polymer by mixing them with the heat-plastified polymer in a conventional mixing device or extruder.

The invention is further illustrated but not limited by the following examples wherein parts are parts by weight unless otherwise indicated.

EXAMPLE I

The catalyst consisting of 0.24 part benzoyl peroxide and 0.10 part of t-butylperbenzoate and the self-extinguishing agent, 2.4 parts of brominated cottonseed oil (Akwilox-133, Swift & Company, Inc.) having a total bromine content of 37 percent by weight and a decomposition temperature range of from 160–165° C. (determined by placing a sample of SE agent in a capillary tube and heating the tube in a Mel-Temp melting point apparatus with a rheostat setting of 40, the decomposition temperature range is the temperature range where rapid evolution of gas occurs), were dissolved in a monomer mix of 80 parts of styrene monomer and 0.4 part of tung oil. This mixture was charged to a 12-ounce crown cap bottle along with 120 parts of water containing as suspending agents 0.11 part of hydroxyethyl cellulose and 0.08 part of tetrasodium pyrophosphate. The bottle was closed and the mixture was heated with end-over-end agitation for seven hours in an oil bath at 92° C. to polymerize the monomer mix into hard beads. The mixture was cooled to 25–30° C. and 0.08 part of the dispersing agent polyoxyethylene(20)-sorbitan monolaurate and 6.3 parts of the blowing agent n-pentane were added separately and in that order to the mixture in the bottle. The contents of the bottle were thoroughly shaken after each addition. The bottle was closed and the mixture reheated for one hour at 92° C. and then the temperature was raised to 115° C. during one-half hour and the heating continued for four hours at 115° C. in order to complete the polymerization as well as impregnate the blowing agent into the beads. The product was separated from the reaction mixture, thoroughly washed with water, and air dried at room temperature.

The dry beads were then expanded in atmospheric steam for 2–4 minutes to a density of approximately two pounds per cubic foot. The beads were permitted to age for 24 hours in the atmosphere and the pre-expanded beads were then molded into a ½ x 5 x 5-inch block, having a self-extinguishing foam structure of small, uniform, closed cells, between the platens of an electrically heated press. The foam block had a density of 2.0 pounds per cubic foot and the fusion was excellent. The foam block was cut into five one-inch strips and the strips conditioned overnight in a 50–60° C. oven to remove any residual blowing agent. Self-extinguishing tests were conducted on the foam strips suspending vertically in a draft-free hood and ignited by holding a one-half inch flame from a micro burner in contact with the bottom of each strip for from 3–5 seconds. The average time to extinguishment of sustained burning after the flame was removed from the strips was determined. The average time to extinguishment for the five strips was 0.8 second. An average time to extinguishment of 1.0 second or less is considered to be adequate for commercial acceptability.

EXAMPLE II

A series of tests were carried out wherein a catalyst consisting of 0.28 part benzoyl peroxide, 0.10 part t-butylperbenzoate and X parts of brominated fatty oil (where X equals the amount shown in Table II) were dissolved in 80 parts of styrene monomer and Y parts of tung oil (where Y equals the amount shown in Table II). These mixtures were charged to 12-ounce crown capped bottles along with 120 parts of water containing as suspending agents 0.64 part tricalcium phosphate and 0.0048 part dodecylbenzene sodium sulfonate (Nacconol NRSF). The bottles were closed and the mixtures were heated with end-over-end agitation for six hours in an oil bath at 90° C. At the end of six hours, an additional 0.8 part tricalcium phosphate and 0.008 part dodecylbenzene sodium sulfonate (Nacconol NRSF) plus 6.3 parts of n-pentane were added. The bottles were recapped and heated with end-over-end agitation for four hours in an oil bath at 115° C. in order to complete the polymerization as well as to impregnate the n-pentane into the beads. Each product was separated from its reaction mixture, thoroughly washed with water and air dried at room temperature. The dried beads of each test were molded into blocks and the self-extinguishing time of the strips determined as described in Example I. The results of the experiments are listed in Table II below.

as well as to impregnate the n-pentane into the beads. The product of each bottle was separated from its reaction mixture, thoroughly washed with water and air dried at

TABLE II

| SE Agent | X Wt. Percent SE Agent in Polymer | Y Wt. Percent Tung Oil in Polymer | Decomposition Temperature of SE Agent, °C. | Percent by Weight Bromine | | SE Time, Seconds | Shrinkage of Molded Foam |
|---|---|---|---|---|---|---|---|
| | | | | In SE Agent | In Polymer | | |
| Brominated Cottonseed Oil | 3.0 | .5 | 160–165 | 37 | 1.1 | 0.9 | Nil. |
| Do | 3.0 | 0 | 160–165 | 37 | 1.1 | 3.1 | Gross. |
| Brominated Rapeseed Oil | 5.0 | .25 | 155–160 | 38 | 1.9 | 0.9 | Nil. |
| Do | 5.0 | 0 | 155–160 | 38 | 1.9 | 1.6 | Gross. |
| Do | 3.0 | .35 | 155–160 | 38 | 1.1 | 0.8 | Nil. |
| Do | 3.0 | 0 | 155–160 | 38 | 1.1 | 3.0 | Gross. |
| Brominated Safflower Oil | 3.0 | .2 | 150–155 | 44 | 1.3 | 0.8 | Nil. |
| Do | 3.0 | 0 | 150–155 | 44 | 1.3 | 2.2 | Gross. |

It can be seen from Table II that the presence of tung oil in the polymer produces self-extinguishing foams, whereas foams containing the same amount of self-extinguishing agent but no tung oil were not self-extinguishing. The molding characteristics of the foams were also improved by the presence of the copolymerized tung oil.

EXAMPLE III

To illustrate the properties of the compositions of the invention as compared to self-extinguishing polymer foams prepared with a commercial SE agent, a series of polymer foams containing the tung oil-brominated fatty oil combination and the commercial fire retardant Firemaster T23P [tris(2,3-dibromopropyl)phosphate] were prepared and tested as follows:

room temperature. The self-extinguishing time of the foam from each product was determined in the same manner as illustrated in Example I with the results shown in Table III. It can be seen from a comparison of the self-extinguishing properties of the foams containing brominated fatty oils with the foams containing Firemaster T23P that the latter compositions required bromine compositions in the polymer of 2.7 percent in order to obtain a self-extinguishing foam, whereas with the tung oil and brominated fatty oil, bromine concentrations as low as about 1.1 percent were effective. The addition of tung oil to the composition containing Firemaster T23P improved the molding properties of the foam but did not appear to affect the self-extinguishing characteristics of the foam.

TABLE III

| SE Agent | X Wt. Percent SE Agent in Polymer | Y Wt. Percent Tung Oil in Polymer | Decomposition Temperature of SE Agent, °C. | Percent by Weight Bromine | | SE Time, Seconds | Shrinkage of Molded Foam |
|---|---|---|---|---|---|---|---|
| | | | | In SE Agent | In Polymer | | |
| Brominated Linseed Oil | 3.0 | .15 | 150–155 | 50 | 1.5 | 0.9 | Nil. |
| Brominated Hempseed Oil | 3.0 | .25 | 165–170 | 48 | 1.4 | 0.8 | Nil. |
| Brominated Corn Oil | 3.0 | .30 | 160–165 | 40 | 1.2 | 0.8 | Nil. |
| Brominated Poppyseed Oil | 3.0 | .50 | 165–170 | 42 | 1.3 | 0.9 | Nil. |
| Brominated Soybean Oil | 3.0 | .50 | 160–165 | 37 | 1.1 | 0.9 | Nil. |
| Brominated Perilla Oil | 3.0 | .10 | 145–150 | 54 | 1.6 | 1.0 | Nil. |
| Brominated Sunflower Oil | 3.0 | .50 | 160–165 | 42 | 1.3 | 0.9 | Nil. |
| Firemaster T23P | 5.0 | 0 | 200–205 | 69 | 3.4 | 0.9 | Gross. |
| Do | 4.0 | 0 | 200–205 | 69 | 2.7 | 0.9 | Do. |
| Do | 3.0 | 0 | 200–205 | 69 | 2.1 | 1.5 | Do. |
| Do | 3.0 | .50 | 200–205 | 69 | 2.1 | 1.5 | Nil. |

A catalyst consisting of 0.10 part t-butylperbenzoate, 0.28 part benzoyl peroxide and X parts of Firemaster T23P or brominated fatty oil (where X is the amount shown in Table III below) and Y parts of tung oil (where Y is the amount shown in Table III below) were dissolved in 80 parts of styrene monomer. Each mixture was charged to a 12-ounce crown cap bottle along with 120 parts of water containing as suspending agents 0.64 part tricalcium phosphate and 0.0048 part dodecylbenzene sodium sulfonate (Nacconol NRSF). The bottles were closed and the mixtures were heated with end-over-end agitation for six hours in an oil bath at 90° C. The mixtures were then cooled to from 25–30° C. and 0.8 part tricalcium phosphate and 0.008 part dodecylbenzene sodium sulfonate (Nacconol NRSF) plus 6.7 parts n-pentane were added. The bottles were reclosed and heated in the oil bath at 115° C. with end-over-end agitation for an additional four hours in order to complete the polymerization of the beads

EXAMPLE IV

The catalyst 0.28 part benzoyl peroxide and 0.10 part t-butyl-perbenzoate and the self-extinguishing agent, three parts brominated rapeseed oil (38% bromine, decomposition temperature 155–160° C.), were dissolved in a monomer mixture of 12 parts α-methylstyrene, 68 parts of styrene, and 0.35 part of tung oil. The mixture was charged to a 12-ounce crown cap bottle along with 120 parts of water containing as suspending agents 0.64 part tricalcium phosphate and 0.0048 part dodecylbenzene sodium sulfonate (Nacconol NRSF). The bottle was closed and the mixture was heated with end-over-end agitation for six hours in an oil bath at 90° C. in order to polymerize the monomer into hard beads. The mixture was then cooled to from 25–30° C. and 0.8 part of tricalcium phosphate, 0.008 part of dodecylbenzene sodium sulfonate (Nacconol NRSF) and 6.7 parts of n-pentane were added to the bottle. The contents of the bottle were thoroughly shaken and the bottle was closed and the mixture was placed in an oil bath for four hours at 115° C. in order to complete the polymerization and impregnate the n-pentane into the beads. The product was separated from the reaction mixture, thoroughly washed with water and air dried at room temperature. The product beads were expanded and molded in accordance with the procedure of Example I. The beads gave a molded foam having a density of two pounds per cubic foot and, when tested in accordance with the procedure described in Example I, gave a self-extinguishing time of 0.8 second. Fusion of the beads was good and the shrinkage of the foam block was nil.

EXAMPLE V

The catalyst 0.28 part benzoyl peroxide and 0.10 part t-butyl-perbenzoate, self-extinguishing agent 1.2 part brominated cottonseed oil (Akwilox–133, Swift & Company, Inc., bromine content 37% by weight, decomposition temperature 160–165° C.) and 0.16 part of the peroxide synergist (Lupersol–130, 2,5-dimethyl-2,5-di(t-butylperoxy)hexyne-3, Lucidol Division Wallace & Tiernan, Inc.) were dissolved in 80 parts of styrene monomer containing 0.4 part tung oil. The mixture was charged to a 12-ounce crown cap bottle along with 120 parts of water containing as suspending agent 0.64 part tricalcium phosphate, 0.0048 part dodecylbenzene sodium sulfonate (Nacconol NRSF). The bottle was capped and placed in an oil bath with end-over-end agitation for six hours at 90° C. in order to polymerize the monomer into hard beads. The mixture was then cooled to from 25–30° C. and an additional 0.8 part tricalcium phosphate and 0.008 part dodecylbenzene sodium sulfonate (Nacconol NRSF) plus 6.7 parts n-pentane were added. The bottle was recapped and then placed in the oil bath for an additional four hours at 115° C. in order to complete polymerization as well as to impregnate the blowing agent of the beads. The product was separated from the reaction mixture and thoroughly washed with water and air dried at room temperature. The product had a bromine content of about 0.56 percent by weight based on the polymer. The beads were expanded and molded with the fire retardant properties of the foam determined as in Example I. The average extinguishing time of one-inch strips was 1.0 second and it was noted that the samples were extremely difficult to ignite.

EXAMPLE VI

A polymer foam was prepared by the process of Example V except that 1.2 parts of Firemaster T23P[tris (2,3-dibromopropyl)phosphate] was used as the self-extinguishing agent in place of the brominated cottonseed oil. The foam had a self-extinguishing time of 5.5 seconds although the foam contained more bromine than the foam prepared in the Example V. This again illustrates the superiority of the compositions of the invention.

The foregoing has described novel self-extinguishing styrene polymer compositions. The compositions contain a brominated fatty oil in combination with copolymerized tung oil, which not only yields foams having good fusion and little tendency to shrink, but the self-extinguishing properties of the self-extinguishing agents are enhanced in a synergistic manner such that the foam can be rendered self-extinguishing with minimum amounts of self-extinguishing agent present.

I claim:

1. A self-extinguishing expandable styrene polymer composition comprising:
a styrene polymer containing a blowing agent and about 0.5–5.0 parts by weight of a fatty oil selected from the group consisting of cottonseed oil, rapeseed oil, safflower oil, linseed oil, hempseed oil, corn oil, poppyseed oil, soybean oil, perilla oil, and sunflower oil, said oil being substantially brominated and being characterized by containing at least two non-terminal, non-conjugated ethylene bonds which are separated by a single methylene group prior to bromination.

2. A self-extinguishing expandable polymer comprising:
a styrene polymer containing an expanding agent and from about 0.1–0.5 percent by weight of polymer of chemically combined tung oil and said polymer having dispersed therein from about 0.5–5 parts by weight of a brominated fatty oil selected from the group consisting of brominated cottonseed oil, brominated rapeseed oil, brominated safflower oil, brominated linseed oil, brominated hempseed oil, brominated corn oil, brominated poppyseed oil, brominated soybean oil, brominated perilla oil, and brominated sunflower oil, said oil being characterized by containing at least two non-terminal, non-conjugated ethylene bonds which are separated by a single methylene group prior to bromination.

3. A self-extinguishing expandable styrene polymer composition comprising:
a styrene-tung oil copolymer containing from 3–20 percent by weight of polymer of a blowing agent wherein said tung oil is present in from about 0.1–0.5 part by weight of tung oil and said copolymer having dispersed therein from 0.5–5.0 parts by weight of a brominated fatty oil selected from the group consisting of brominated cottonseed oil, brominated rapeseed oil, brominated safflower oil, brominated poppyseed oil, brominated soybean oil, brominated perilla oil, and brominated sunflower oil, said oil being characterized by having a decomposition temperature from about 140° to 180° C. and being further characterized by containing at least two non-terminal, non-conjugated ethylene bonds, which are separated by a single methylene group, prior to bromination.

4. A self-extinguishing expanded styrene polymer foam structure comprising:
a foamed, cellular styrene polymer structure containing as a self-extinguishing agent from about 0.5–5 parts by weight of a brominated fatty oil derived from a fatty oil selected from the group consisting of cottonseed oil, rapeseed oil, safflower oil, linseed oil, hempseed oil, corn oil, poppyseed oil, soybean oil, perilla oil, and sunflower oil.

5. A self-extinguishing expanded styrene polymer foam structure comprising:
a foamed, cellular styrene polymer structure containing from 0.1–0.5 percent by weight of polymer of chemically combined tung oil and having dispersed therein as a self-extinguishing agent from 0.5–5 parts by weight of a brominated fatty oil derived from a fatty oil selected from the group consisting of cottonseed oil, rapeseed oil, safflower oil, linseed oil, hempseed oil, corn oil, poppyseed oil, soybean oil, perilla oil, and sunflower oil.

6. A self-extinguishing expandable styrene polymer composition comprising:
a styrene polymer containing from 3–20 percent by weight of a blowing agent and from about 0.5–5.0 parts by weight of a fatty oil that is selected from the group consisting of cottonseed oil, rapeseed oil, safflower oil, linseed oil, hempseed oil, corn oil, poppyseed oil, soybean oil, perilla oil, and sunflower oil, and that contains a total of at least about 29 percent of a material selected from the class consisting of linoleic acid and linolenic acid, said oil being substantially brominated.

7. The composition of claim 6 wherein the styrene polymer includes from about 0.1–0.5 percent by weight of polymer of chemically combined tung oil.

8. A self-extinguishing expandable styrene polymer composition comprising:
a styrene polymer containing a blowing agent and about 0.5–5.0 parts by weight of a fatty oil that contains a total of at least about 29 percent of an acid selected from the class consisting of linoleic and linolenic acid, said oil being brominated to the extent of about 95% of the theoretical amount.

9. A self-extinguishing expandable styrene polymer composition comprising:
a styrene polymer containing a blowing agent and about 0.5–5.0 parts by weight of a fatty oil that contains a total of at least about 29 percent of a fatty acid moiety, said fatty acid moiety being characterized by containing at least two non-terminal, non-conjugated ethylene bonds which are separated by a single methylene group prior to bromination, said oil being brominated to the extent of about 95% of the theoretical amount.

References Cited

UNITED STATES PATENTS

| | | | |
|---|---|---|---|
| 2,602,820 | 7/1952 | Schmerling | 260—23 |
| 2,647,094 | 7/1953 | Hahn | 260—23 |
| 2,675,325 | 4/1954 | Dill | 260—23 |
| 2,675,362 | 4/1954 | Shusman | 260—23 |

MURRAY TILLMAN, *Primary Examiner.*

M. FOELAK, *Assistant Examiner.*